(12) United States Patent
DeRosa et al.

(10) Patent No.: US 6,493,478 B1
(45) Date of Patent: Dec. 10, 2002

(54) PHOTOTHERMAL OPTICAL SWITCH AND VARIABLE ATTENUATOR

(75) Inventors: Michael E. DeRosa, Painted Post, NY (US); Celine C. Guermeur, Chartrettes (FR); Stephen L. Loguov, Corning, NY (US); Marc Moroni, Melun (FR); Guilhem M. Vidiella, Paris (FR)

(73) Assignee: Corning Incorporated, Corning, NY (US)

( * ) Notice: Subject to any disclaimer, the term of this patent is extended or adjusted under 35 U.S.C. 154(b) by 47 days.

(21) Appl. No.: 09/727,004

(22) Filed: Nov. 30, 2000

(30) Foreign Application Priority Data

Dec. 16, 1999 (EP) ............................................. 99403166

(51) Int. Cl.[7] .............................. G02B 6/26; G02B 6/42
(52) U.S. Cl. ............................. 385/16; 385/14; 385/24; 385/140
(58) Field of Search ............................. 385/16–24, 140, 385/14

(56) References Cited

U.S. PATENT DOCUMENTS

| | | | | |
|---|---|---|---|---|
| 5,016,958 A | * | 5/1991 | Booth .......................... | 385/45 |
| 5,080,504 A | | 1/1992 | Partain et al. ................ | 385/17 |
| 5,166,988 A | | 11/1992 | Bobb et al. .................... | 385/1 |
| 5,224,185 A | | 6/1993 | Ito et al. ........................ | 385/40 |
| 5,247,594 A | | 9/1993 | Okuno et al. ................. | 385/17 |
| 5,315,422 A | | 5/1994 | Utaka et al. ................. | 359/107 |
| 5,329,601 A | | 7/1994 | Nakamura .................... | 385/41 |
| 5,382,985 A | | 1/1995 | Becker et al. ............... | 359/289 |
| 5,432,873 A | | 7/1995 | Hosoya et al. ................ | 385/21 |
| 5,892,863 A | | 4/1999 | Presby ......................... | 385/16 |
| 5,908,916 A | | 6/1999 | Woudenberg et al. ...... | 528/196 |

FOREIGN PATENT DOCUMENTS

| | | |
|---|---|---|
| EP | 0233310 | 7/1986 |
| EP | 0 460 766 | 12/1996 |
| JP | 61113024 | 5/1986 |
| JP | 02001827 | 6/1988 |

OTHER PUBLICATIONS

Buller, G. S. et al.; *Application Of Optothermal Optically Bistable Devices To Telecommunications Switching*; Journal De Physique; Colloque C2, Supplement au No. 6; Tome 49, Jun. 1988.

Welker et al., *All–optical switching in a dye–doped polymer fiber Fabry–Perot waveguide*, Applied Physics Letters, vol. 69, No. 13, Sep. 23, 1996, pp. 1835–1836.

* cited by examiner

Primary Examiner—Phan T. H Palmer
(74) Attorney, Agent, or Firm—Gregory V. Bean

(57) ABSTRACT

An optical device which utilizes a photothermal optical effect to achieve switching or attenuation includes a waveguide defined by a waveguide core and a surrounding cladding, wherein the polymer waveguide core includes a region consisting of a photothermally responsive material having an absorption coefficient at a switch wavelength or attenuation wavelength that is higher than an absorption coefficient at a signal wavelength. Switching devices include an optical splitter circuit having a branch that includes the photothermally responsive material, and either a multiplexer for introducing light at the switch wavelength into the optical circuit or a light source focused at the photothermally responsive material. Attenuating devices include a Mach-Zehnder type interferometer having a branch that includes the photothermally responsive material and either a multiplexer for introducing light at the attenuation wavelength into the optical circuit or a light source focused at the photothermally responsive material.

22 Claims, 3 Drawing Sheets

PHOTOTHERMAL OPTICAL SWITCH AND VARIABLE ATTENUATOR

BACKGROUND OF THE INVENTION

1. Field of the Invention

This invention relates generally to optical devices, and more particularly to a thermorefractive switch or attenuator utilizing temperature dependence of the refractive index of a waveguide core to effect switching or attenuation in an optical device.

2. Technical Background

Optical switching devices are known which utilize materials in which the refractive index of a polymer waveguide material can be controlled through various phenomena such as by a second order nonlinear electrooptic effect, a third order nonlinear optical Kerr effect, a thermooptic effect, or an acoustooptic effect. Polymers have been used in thermooptic switches because of their large negative variations in the index of refraction as a function of temperature (dn/dT), which are typically about $-3 \times 10^{-4} K^{-1}$. Stated differently, polymer materials are useful in the fabrication of thermooptic switches because a relatively small temperature change can effect a relatively large change in the refractive index of the polymer.

Typical polymer based thermooptic switches use thin film electrical strip heaters in contact with a planar polymer waveguide. These heaters effect a change in the refractive index thus causing thermooptic switching to occur. Fabrication of such devices requires metal electrode deposition techniques and integration of electronics into the planar optical devices which increase the complexity and cost of the device. A further disadvantage is that most electrically heated thermooptical devices are limited to switching speeds of about one to about two milliseconds due to thermal diffusion time lag.

It has been known that thermooptic effects can be induced in polymers by a photothermal phenomena in which light absorbed by the polymer is converted into heat which causes a change in refractive index. The change in temperature in a material due to absorption at steady state can be approximated by the following equation:

$$\Delta T = \frac{\alpha P \tau_C}{\pi r^2 \rho C}$$

where $\alpha$ is the absorption coefficient, P is the steady state power, $\tau_C$ is the characteristic decay time after the power has been turned off, r is the spot size radius of the area of the material which is irradiated with light having steady state power P, $\rho$ is the density of the material, and C is the heat capacity of the material. By exploiting photothermal effects, active switches can be developed by inducing local refractive index changes due to a finite amount of localized absorption of light by the polymer. A known device utilizing a photothermal effect for optical switching comprises a substrate of light absorbent material, means defining a plurality of holes of pre-selected size through the substrate, the holes being defined through the substrate, and a liquid material disposed within the holes. The liquid material has an index of refraction which is substantially temperature dependent over a selected temperature range of operation for the device. A disadvantage with this device is that it uses a liquid material which could potentially escape from the device, rendering the device inoperative. Accordingly, a solid state device is preferable.

An optical switch comprising a waveguide having a polymeric waveguide core including a region containing molecules which absorb energy from a light source and thereby heat the core and change the refractive index of the core are described in the patent literature. The device includes a waveguide having an input region, a Y-branch which splits light entering the input region into the two separate branches, and a coupling region. One of the two branches includes a means for changing the temperature to cause a change in refractive index, which in turn results in a phase shift between the light propagated through each of the two branches. When the light enters the coupling region a predetermined transfer, or switching, of light occurs from one leg to the other, with the amount of the transfer depending upon the phase change.

SUMMARY OF THE INVENTION

The invention provides an optical switching device which is capable of achieving submillisecond switching or attenuation for regions that are irradiated on the order of the size of a single mode waveguide mode field diameter.

In accordance with an aspect of this invention, an optical switch is provided which includes an optical splitter having a waveguide defined by a core and a surrounding cladding, wherein the waveguide includes an input leg, and first and second branch legs. The branch legs and the input leg are joined at a junction wherein light may be propagated from the input leg through each of the branch legs. The first branch leg includes at least a region comprised of a material having an absorption coefficient at a switch wavelength that is higher than an absorption coefficient at a signal wavelength.

In accordance with another aspect of the invention, a variable optical attenuator is provided. The variable attenuator includes a waveguide defined by a core and a surrounding cladding, wherein the core includes a first input waveguide section, a second waveguide section branching from the first waveguide section at a first junction, a third waveguide section branching from the first waveguide section at the first junction, and a fourth output waveguide section joined to the second and third waveguide sections at a second junction. The second waveguide section includes a region comprising a material which changes refractive index when exposed to light at an attenuation wavelength, but which is unresponsive to light at a signal wavelength.

DETAILED DESCRIPTION OF THE PREFERRED EMBODIMENT

Figure 1:
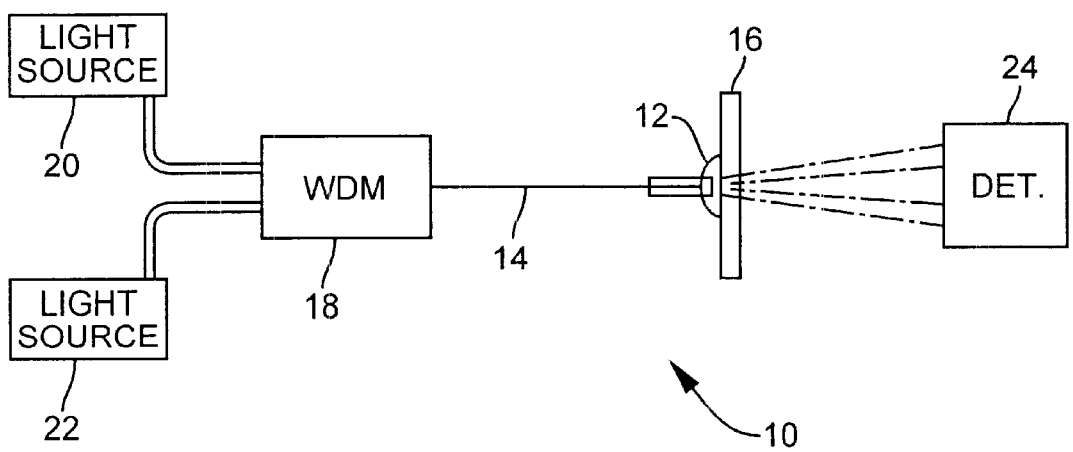
FIG. 1 is a block diagram of the testing equipment used for demonstrating the fast switch decay using the present invention.

The invention relates to the generation of heat in a thermooptical device through a light absorption mechanism. All or part of the waveguide regions of planar optical devices may be provided with a polymer waveguide core having an absorption coefficient at a switch wavelength or an attenuation wavelength that is higher than an absorption coefficient at a signal wavelength. Preferably, the absorption coefficient at the switch wavelength or attenuation a wavelength is at least about 100 times higher than the absorption coefficient at the signal wavelength within at least a section of the polymer waveguide core. Those regions may comprise a polymer inherently having such property, or may comprise a polymer blended with a material which absorbs light at the switch wavelength or attenuation wavelength and is substantially transparent to light at the signal wavelength. The polymer waveguide material which has an absorption coefficient at a switch wavelength that is higher than an absorption coefficient at a signal wavelength will hereafter be referred to as switching material or attenuating material, depending on the application. When the switching material or attenuating material, or at least a portion thereof, is exposed to light at the switch wavelength or attenuation wavelength, the exposed portion of the switching material or attenuating material absorbs the light at the switch wavelength or attenuation wavelength and converts it into heat, thereby raising the temperature and lowering the refractive index of the exposed portion of the switching material or attenuating material. This photothermal optical effect allows much faster switching and attenuating as compared with conventional devices using thin film electrical strip heaters because heat is generated in the waveguide core instead of being generated outside of the waveguide and conducted through the cladding to the core.

The faster switching or attenuating is based on the characteristic thermal propagation time ($\tau_{char}$) given by the equation:

$$\blacksquare$$

where "a" is the radius of the irradiated zone, and $\chi$ is the thermal diffusivity of the switching material or attenuating material. Using a typical value for the thermal diffusivity of polymers used for optical waveguide cores, the above equation suggests that it is possible to achieve submillisecond switching when the regions that are irradiated are on the order of the size of a single mode waveguide mode field diameter.

The magnitude of the photothermal effect can be enhanced by increasing the absorption of the polymer waveguide at a specified switch wavelength or attenuation wavelength. In this manner, it is possible to have a polymer waveguide that is transparent to the signal wavelength (e.g. about 1300 nm or about 1550 nm) but can be switched photothermally by a different switch wavelength or attenuation wavelength (e.g. from about 700 to about 800 nm). The polymer can be made to absorb more light at the switch wavelength or attenuation wavelength by incorporation a chromophore that absorbs light at the switch wavelength or attenuation wavelength and is substantially transparent to the signal wavelength.

Figure 2:
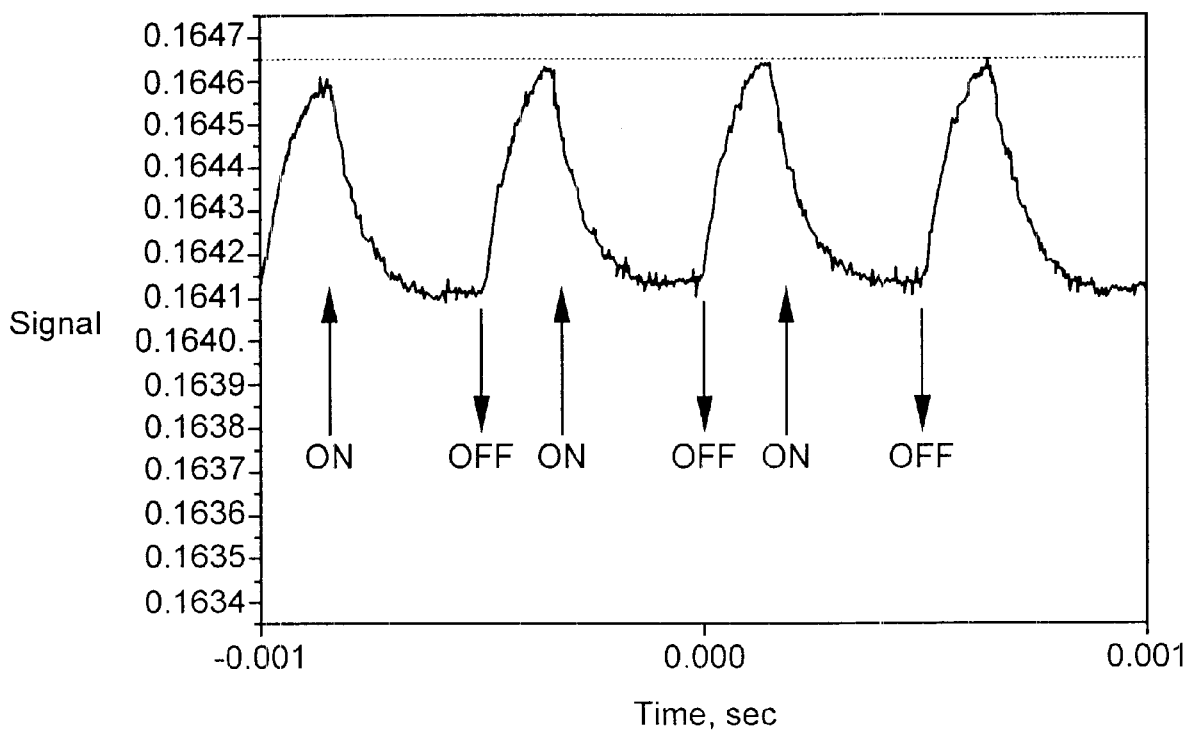
FIG 2 is a graph demonstrating the fast switching response of the device of the present invention shown in FIG. 1.

The test apparatus 10 shown in FIG. 1 was used to demonstrate submillisecond switching of the refractive index of an organic adhesive material 12 (switching material) at the end of a single mode optical fiber 14. The apparatus demonstrated that it was possible to achieve fast switch decay times due to the small size of the irradiated dimensions provided by a single mode fiber. A photothermal pump probe experiment was performed on adhesive 12. Adhesive 12 was bonded to an end of a flat cleaved optical fiber 14. Optical fiber 14 was mounted perpendicular to a glass slide 16 so that adhesive 12 was between glass slide 16 and the end of fiber 14. The path length of adhesive 12 was approximately 100 micrometers and the mode field diameter at a wavelength of 1550 nm was approximately 10 micrometers. A wavelength division multiplexer (WDM) 18 was used to couple light having a wavelength of 633 nm from a light source 20 with light having a wavelength of 1550 nm from light source 22. The power of the 633 nm light was monitored with a silicon photodiode detector located about 10 centimeters from glass slide 16. As adhesive 12 absorbed light having a wavelength of 1550 nm, the negative change in refractive index due to a temperature increase caused the beam of light emitted from glass slide 16 toward light detector 24 to defocus, thus causing the power to drop. FIG. 2 shows the response of the 633 nm light modulated by the 1550 nm light at 2 KHz. The thermal characteristic decay time was measured to be about 240 microseconds.

Figure 3:
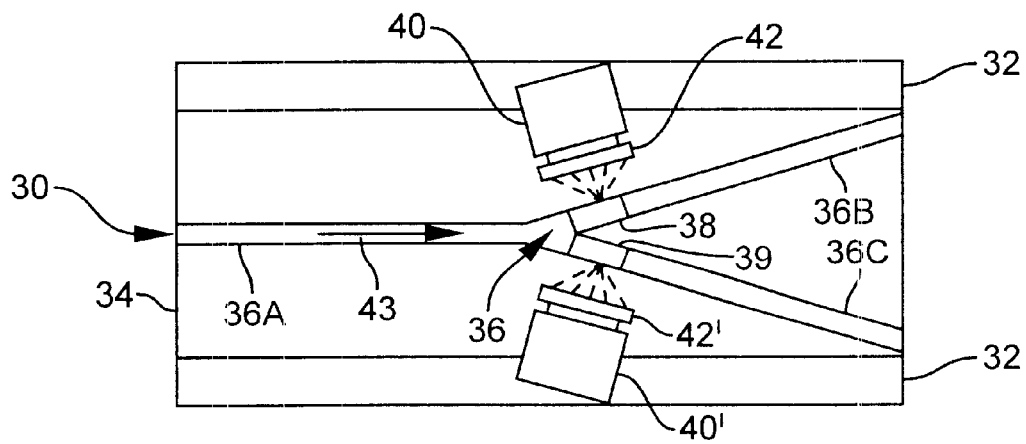
FIG. 3 is a schematic view of a 1×2 photothermal switching device in which switching is achieved by irradiating a local region of a polymer waveguide core with light at a switch wavelength.

In FIG. 3, there is shown a 1×2 photothermal switch 30 including a substrate 32 on which is formed a waveguide comprising waveguide cladding 34 and a waveguide core 36. Although illustrated schematically in FIG. 3, it is well known in the art that cladding 34 completely surrounds or envelops waveguide core 36. Typically by first depositing a layer of undercladding material on substrate 32, forming a patterned waveguide core 36 on the undercladding, and overcoating the patterned waveguide core 36 so that core 36 is surrounded by cladding material having an index of refraction less than the index of refraction of waveguide core 36. Waveguide core 36 is made of a polymeric material that is transparent to a signal wavelength (typically a signal having a wavelength of about 1300, about 1310 or from about 1530 to about 1570 nm), but which absorbs light at a switch wavelength (e.g. 700–800 nm). It should be understood that the expressions "transparent" and "absorbent" as used to describe the ability of a material to propagate and absorb light are relative terms. Likewise, it is to be understood that the expressions "photothermally responsive", "photothermally unresponsive" and the like are also relative terms. That is transparent materials may absorb some light, and absorbing materials may absorb only a small fraction of an impinging light and allow the remaining light to propagate through the absorbent material. However, the polymeric switching material preferably has at least a two order of magnitude higher absorption coefficient at the switch wavelength than at the signal wavelength. The high absorption coefficient at the switch wavelength can be inherent in the polymeric structure or can be incorporated into the switching material by blending a suitable polymer with a material which when blended with the polymer absorbs light at the switch wavelength and is substantially transparent to light at the signal wavelength. The light absorbing material can for example be a linear absorbing dye that is either doped or covalently attached to the polymeric structure. Examples of organic dyes that can be used include quinone, indanthrenes, methine and polymethines, phthalocyanines, naphthalocyanines, and porphyrins. Device 30 is a Y splitter having waveguide core 36 which includes an input leg 36A and branch output legs 36B and 36C which branch or split away from input leg 36A at junction 36C. One or both of branch legs 36B and 36C may include a region 38 in which the waveguide core is comprised of a polymeric material having an absorption coefficient at a switch wavelength that is at least about 100 times higher than an absorption coefficient at a signal wavelength (i.e., switching material). For example, region 38 may comprise a polymer blend containing a dye that absorbs light at the switch wavelength and is transparent to light at the signal wavelength. The switching material region is located adjacent junction 36C. A laser diode 40 and a microlens 42 are mounted on substrate 32 to focus light at the switch wavelength on region 38 (switching material) of waveguide core 36. When light at the switch wavelength is focused on region 38 from laser diode 40, the refractive index of region 38 is reduced as the temperature of region 38 increases. When the refractive index is low enough to cause total internal reflection (i.e., when the refractive index of the switching material at region 38 is about the same as the refractive index of the cladding), a signal beam propagated through waveguide 36 in the direction indicated by arrow 43 is directed exclusively through branch leg 36C, with substantially none of the light being directed through branch leg 36B. The switch signal from laser diode 40 is focused on an area of switching material in region 38 having a diameter of approximately 8 to 10 microns. Although the switching material is localized in area 38 of the illustrated embodiment (i.e., is focused on a small spot), and because the photothermal effect occurs only at the spot illuminated by light at the switch wavelength, the entire waveguide 36 may be comprised of switching material. However, in this case care should be taken to ensure that the light at the switch wavelength is focused on region 38 and not on input leg 36A. This may be preferred to simplify fabrication when the switching material is relatively inexpensive. A region 39, similar to region 38, may be provided in leg 36C, and laser diode 40' and microlens 42' may be provided to allow light to be exclusively propagated through leg 36B when diode 40 is off and diode 40' is on.

Figure 4:
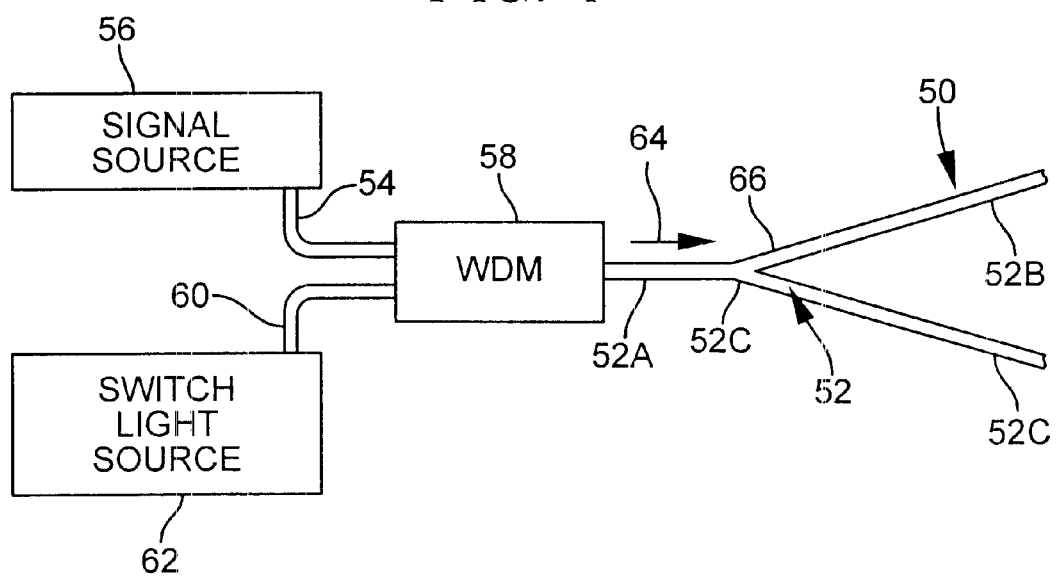
FIG. 4 is a schematic view of a 1×2 photothermal switching device in which switching is achieved by propagating a switch signal through a waveguide.

As another alternative, rather than focusing a beam of light at the switch wavelength at the waveguide core, light at the switch wavelength may be propagated through the waveguide of an optical switching device along with light at the signal wavelength using a wavelength division multiplexer as shown in FIG. 4. Optical switching device 50 shown in FIG. 4 includes a waveguide core 52 including an input leg 52A and two branch legs 52B and 52C which branch or split away from input leg 52A at junction 52C. An optical fiber 54 is used for directing light at a signal wavelength from a light source 56 to an input port on a wavelength division multiplexer 58, and an optical fiber 60 is used for directing light at a switch wavelength from light source 62 to a second input port on wavelength division multiplexer 58. The signals are combined by wavelength division multiplexer 58 and are propagated through main leg 52A from an output port of wavelength division multiplexer 58 in the direction generally indicated by arrow 64. Branch leg 52B includes a region 66 comprised of a switching material having an absorption coefficient at the switch wavelength that is higher than the absorption coefficient at the signal wavelength. When light at the switch wavelength from light source 62 is not directed into wave division multiplexer 58, light at the signal wavelength from light source 56 is split between branch legs 52B and 52C. However, when the switch light from light source 62 is directed into the optical circuit, the light at the switch wavelength is absorbed by the switching material at region 66 of branch leg 52B of waveguide core 52, and the material at region 66 is heated causing the index of refraction to change, thus preventing light from being propagated through branch leg 52B, such that all of the light at the signal wavelength propagates through branch leg 52C (i.e., region 66 behaves as part of the cladding).

As a specific example, a 1 mmol concentration of phthalocyanine dye in the switching material regions 38, 66 of the waveguide cores in the devices shown in FIGS. 3 and 4 would have an absorption coefficient of about 150 cm$^{-1}$ at 698 nm. Thus, it would be possible to induce a refractive index change of about $5\times10^{-3}$ with a 0.5 mW laser diode focused on a 10 micrometer diameter spot on the switching material for the embodiment shown in FIG. 3, or coupled into the fiber as shown in the embodiment of FIG. 4.

Figure 5:
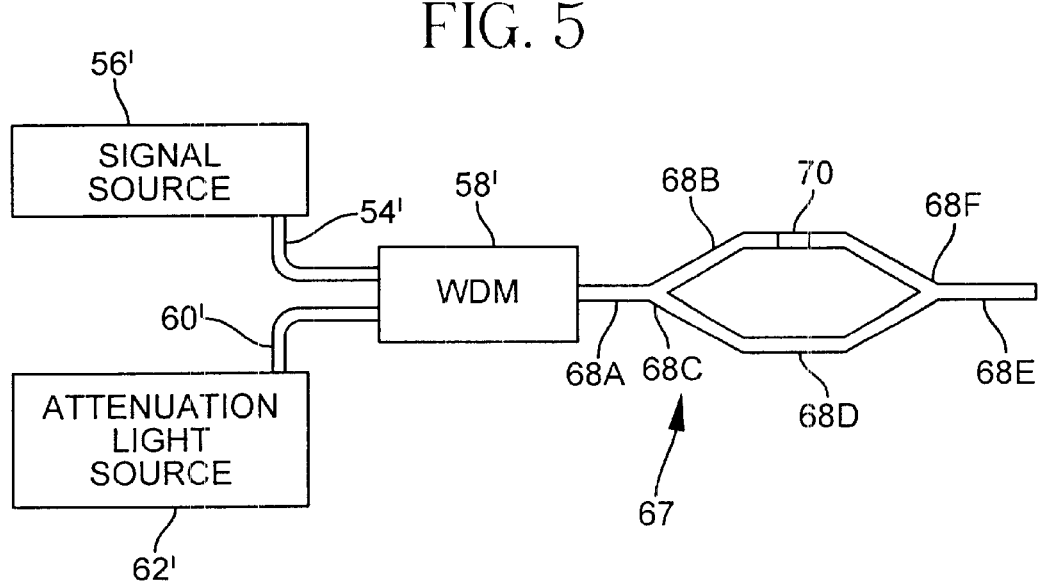
FIG. 5 is a schematic view of a photothermal variable attenuator in which attenuation is achieved by propagating light at the attenuating wavelength through the device.

In accordance with another aspect of the invention, a variable attenuator employing the attenuating material of this invention is shown in FIG. 5. Variable attenuator 67 includes a wave division multiplexer 58', a signal source 56', a waveguide 54 (such as an optical fiber) for propagating light to an input on wave division multiplexer 58, an attenuation light source 62', a waveguide 60' (such as an optical fiber) for propagating light from the attenuation light source to an input on wave division multiplexer 58', and an interferometer waveguide 68A–68F including a region 70 comprising a photothermally responsive attenuation material which changes refractive index upon exposure to light at an attenuation wavelength. The attenuating material at region 70 may be identical to the switching material at region 38. Interferometer 68 has a Mach-Zehnder geometry comprising a first input waveguide section 68A, a second waveguide section 68B which branches from the first waveguide section at first junction 68C, a third waveguide section 68D which also branches from first input waveguide section 68A at first junction 68C, and a fourth output waveguide section 68E joined to the second waveguide section 68B and the third waveguide section 68D at a second junction 68F. When light at an attenuation wavelength is emitted from attenuation light source 62', the region 70 absorbs the light at the attenuation wavelength, which heats and changes the refractive index of region 70. This change in the refractive index of region 70 causes light at the signal wavelength to propagate through region 70 at a different speed. As a result, there is a phase shift of the light propagating through section 68B relative to light propagating through section 68D. When light propagating through section 68B and 68D are recombined at junction 68F, destructive and/or constructive interference can result in light propagated through waveguide section 68E having the same amplitude or intensity as light propagated through input waveguide 68A when the phase shift is zero (assuming negligible losses through the waveguides), essentially no light propagating through output waveguide 68E when the phase shift is 180° (or $\pi$ radians), or any amplitude or intensity inbetween, depending on the amount of the phase shift. The phase shift, and, therefore, the amount of attenuation, can be controlled depending on the power or intensity of the light at the attenuation wavelength which is emitted from attenuation light source 62'.

Figure 6:
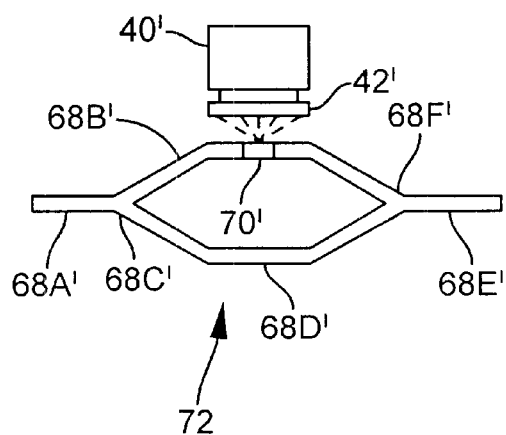
FIG. 6 is a schematic view of a photothermal variable attenuator in which attenuation is achieved by directing light at the attenuating wavelength at a photothermally responsive region of the device.

In FIG. 6, there is shown an alternative variable attenuator 72. Variable attenuator 72 includes a Mach-Zehnder type interferometer similar to that shown in FIG. 5, including input waveguide section 68A', branch waveguide section 68B' branching from input waveguide section 68A' at junction 68C', branch waveguide section 68D also branching from input waveguide section 68A' at junction 68C', and output waveguide section 68E' joined to branches 68B' and 68D' at junction 68F'. Branch waveguide section 68B' includes a region 70' comprising an attenuating material which is photothermally responsive to light at an attenuating wavelength, but is not responsive to light at a signal wavelength. Variable attenuator 72 operates in substantially the same manner as variable attenuator 68, except rather than propagating light at both the signal wavelength and the attenuating wavelength through the Mach-Zehnder type waveguide, as with the embodiment of FIG. 5, only the signal is propagated through the waveguide of device 72 shown in FIG. 62 while light at the attenuating wavelength is focused on region 70' from an external laser diode 40' by a lens 42'.

The switching materials, such as those used in regions 38, 66 and 69 of the embodiments shown in FIGS. 3, 4, 5 and 6 respectively, can be made by blending a polymer which is suitable for forming a polymer waveguide core with a material that, when blended with the polymer, absorbs light at the switch wavelength, but is substantially transparent to light at the signal wavelength. Examples of suitable polymers include copolymers containing fluorinated monomers (such as those selected from vinylic, acrylic, methacrylic and/or allylic monomers), with specific examples including copolymers made from about 15% to about 70% by weight of pentafluorostyrene and from about 30% to about 85% by weight trifluoroethylmethacrylate.

In order to have a good switching efficiency, the absorbent should exhibit strong absorption at a photodiode wavelength sufficiently far from the signal wavelength (e.g., 1300 nm or 1550 nm) to limit losses due to the absorption tail. In the theoretical case of a cylindrical core in which the heat is homogeneously generated, it can be shown (see table below) that the requirement $\alpha_{max}$ L=0.5–1.3 has to be met (in the case of polymers or hybrid sol-gel media) in order to obtain a phase shift of $\pi$ for an input control power P° in the range of 10–20 mW ($\alpha_{max}$ is the maximum absorption coefficient and L the distance over which the signal is phase-shifted).

For a digital geometry (DOS), an index variation of at least $10^{-3}$ is commonly required to achieve the commutation between the arms in the splitting zone of length L ranging from 1 to 2 mm. By using a material with a dn/dT of $2 \times 10^{-4}$ and a thermal conductivity ($\chi$) of 0.15 w/(mK) (i. e., reasonable values for polymers or hybrid sol-gels), the required absorption coefficient will be in the range of 500–1000 m$^{-1}$ provided that the input control power is large enough (P°>30 mW).

Table I summarizes the criteria and requirements for each design. The requirements concern the input control power delivered by a visible source at a wavelength $\lambda_{max}$ for which the absorption coefficient is maximal. From this last value and taking into account the requirement of propagating losses (absorption at the waveguiding wavelengths $\alpha_{wg} = \alpha_{1.3-1.6}$ μm lower than 0.1 dB/cm or 2.3 m$^{-1}$) the minimum absorption ratio $\alpha_{max}/\alpha_{wg}$ required is determined.

TABLE 1

|  | Mach-Zehnder | DOS |
|---|---|---|
| Core physical properties (polymers, hybrid sol-gels) |  | dn/dT = 2.10$^{-4}$ $\chi$ = 0.15W/(m.K) |
| Criterions | $\Delta\phi(L) = \pi$ L ~ 1 cm | $\Delta n(L) = 10^{-3} - 5.10^{-3}$ L = 1–2 mm (splitting zone length) |
| Requirements |  |  |
| –P°: input control power (visible diode) at $\lambda_{max}$ | P° = 10–20 mW | P° = 30–300 mw (**) |
| –$\alpha_{max}$: visible maximal absorption at $\alpha_{max}$ | –$\alpha_{max}$.L ~ 0.5–1.3 –$\alpha_{max}$ ~ 0.5–1.3 cm$^{-1}$ $\alpha_{max}/\alpha_{wg}$ > 20–60 (*) | –$\alpha_{max\ -\ 5-10\ cm}^{-1}$ $\alpha_{max}/\alpha_{wg\ >\ 220-450\ cm}^{-1}$ (***) |

(*) The minimum value is a function of the input control power P°. These two values are related respectively to P° = 20 mW and P° = 10 mW (current visible LD power).
(**) These two values are deduced from the condition P° > 2.72 $\Delta n(L).L.4\pi\chi/(dn/dT)$ applied to the criterion extreme values of $\Delta n$ and L.
(***) Deduced from the optimal condition –$\alpha_{max-1/L\ (1mm\ <\ L\ <\ 2\ mm)}$.

Organic dyes can be incorporated into polymeric or mainly polymeric waveguides. For example, an absorption coefficient of 720 cm$^{-1}$ and below 0.4 cm$^{-1}$ can be obtained at 556 nm and 1550 nm respectively with Crystal Violet embedded in a partially fluorinated polymer.

| Material | Absorption ratio $\alpha_{res}\ \alpha_{1.55\ \mu m}$ (*) | Resonance position ($\lambda_{max}$) |
|---|---|---|
| Crystal Violet embedded in partially fluorinated polymer | >1800 | 556 nm |

* The absorption ratio is equal to the equivalent optical density ratio.

Other dyes can be used to shift the $\lambda_{max}$ to higher wavelengths, to match the emission wavelength of commercial light emitting diodes (LEDs) or laser diodes (LDS).

Metallic ions can be incorporated into organic or inorganic waveguides. The absorbance of cobalt (II) at 600 nm is about 2.2. Co(II) could be introduced at the same concentration in a glass that fulfills the transparency requirement at the waveguiding wavelength ($\alpha_{max}/\alpha_{wg}$>320). This value is in the appropriate range for Mach-Zehnder or DOS switches.

The surface plasmon resonance taking place in small metallic particles leads to a huge increase of the effective cross section around the resonance wavelength. This wavelength is situated in the visible spectrum for most metals in silica-like, polymeric or composite surrounding media. The width of the resonance is about 50 to 100 nm for small particles (~20–100 nm average particle size). It is possible to use this selective absorption in the visible region (at the resonance) to create local heating and induce an index of refraction change. Different metals have been analyzed. Table II gives the main characteristics.

TABLE II

| Metal | Maximal absorption (*) ratio $\alpha_{res}/\alpha_{1.55\ \mu m}$ | Particle diameter for $\alpha_{res}/\alpha_{1.55\ \mu m} > 60$ | Resonance position ($\lambda_{max}$) |
|---|---|---|---|
| Cu | 120–325 | <100 nm | 380–610 nm |
| Au | 170–920 | <100 nm | 520–614 nm |
| Ag | 155–2300 | <100 nm | 410–534 nm |
| Pt | 60–80 | <30 nm | 280–300 nm |
| Pd | 60–130 | <60 nm | 280–330 nm |

(*) The absorption ratio decreases with increasing particles diameter.

The following conclusion can be drawn from these figures:

The maximal absorption ratio is obtained for small particles as long as they behave as a conductor.

Silver shows the best performance. However, a trade-off has to be made between maximum absorption ratio and the resonance spectral position ($\lambda_{max}$) The latter has to match with currently available LEDs or LDs. For this reason, gold is a better candidate.

The invention has many advantages over conventional switch designs. In conventional switch designs, the heating is provided by heaters placed above the guides and cladding. The heat has to diffuse through the cladding before it can warm the waveguide core, which changes the refractive index of the core and then induces switching. In this invention, heating is internal to the waveguide core, with no delay due to heat conduction through the cladding. As a result, a decrease of switching time to less than 1 $\mu$s can be realized. Moreover, the switching power may be lowered by as much as two orders of magnitude. In usual thermooptical switches the power required is about 500 mW. In this invention the power required is only in the 10–50 mW range for light induced thermooptical switches.

It will become apparent to those skilled in the art that various modifications and adaptations can be made to the present invention without departing from the spirit and scope of this invention. Thus, it is intended that the present invention cover the modifications and adaptations of this invention, provided that they come within the scope of the appended claims and their equivalents.

What is claimed is:

1. An optical switch for switching light at a switch wavelength as opposed to a signal wavelength, the optical switch comprising:

a splitter having a waveguide defined by a core and a cladding surrounding the core, the core including an input leg, a first branch leg, and a second branch leg, the first branch leg and the seconds branch leg joined at a junction whereby the light may be propagated from the input leg through each of the first branch leg and the second branch leg, at least the first branch leg including a region fabricated from a material which changes refractive index when exposed to the light at an attenuation wavelength, but which is unresponsive to the light at a signal wavelength;

a laser diode for emitting the light at the switch wavelength; and a lens for focusing the light at the switch wavelength at the region of the first branch leg fabricated from the material which changes refractive index when exposed to the light at an attenuation wavelength, but which is unresponsive to the light at a signal wavelength.

2. An optical switch for switching light at a switch wavelength as opposed to a signal wavelength, the optical switch comprising:

a splitter having a waveguide defined by a core and a cladding surrounding the core, the core including an input leg, a first branch leg, and a second branch leg, the first branch leg and the seconds branch leg joined at a junction whereby the light may be propagated from the input leg through each of the first branch leg and the second branch leg, at least the first branch leg including a region fabricated from a material having an absorption coefficient at the switch wavelength that is higher than an absorption coefficient at the signal wavelength, wherein the material has an absorption coefficient at the switching wavelength that is at least about 100 times higher than the absorption coefficient at the signal wavelength.

3. The optical switch of claim 2 wherein a portion of the core comprises:

a blend of a polymer and an added material which when blended with the polymer imparts to the blend the ability to absorb light at the switch wavelength while remaining generally transparent to light at the signal wavelength.

4. The optical switch of claim 3 wherein the added material is selected from a group consisting of quinone, indanthrenes, methine, polymethines, phthalocyanines, naphthalocyanines, porphyrins, organic dyes, a metal ion, or metal particles.

5. The optical switch of claim 4 wherein the metal particles have an average particle size of from about 20 nm to about 100 nm.

6. The optical switch of claim 5 wherein the metal particles are selected from a group consisting of copper, gold, silver, platinum, or palladium.

7. The optical switch of claim 4 wherein the organic dye is crystal violet.

8. The optical switch of claim 6 wherein the metal ion is Co(II).

9. The optical switch of claim 3 wherein the added material is physically blended with the polymer.

10. The optical switch of claim 3 wherein the added material is covalently bonded with the polymer.

11. An optical switch for switching light at a switch wavelength as opposed to a signal wavelength, the optical switch comprising:

a splitter having a waveguide defined by a core and a cladding surrounding the core, the core including an input leg, a first branch leg, and a second branch leg, the first branch leg and the seconds branch leg joined at a junction whereby the light may be propagated from the input leg through each of the first branch leg and the second branch leg, at least the first branch leg including a region fabricated from a material having an absorption coefficient at the switch wavelength that is higher than an absorption coefficient at the signal wavelength; and a multiplexer for combining the light at the signal wavelength and the light at the switch wavelength to produce combined light, and propagating the combined light through the input leg.

12. An optical switch for switching light at a switch wavelength as opposed to a signal wavelength, the optical switch comprising:

a splitter having a waveguide defined by a core and a cladding surrounding the core, the core including an input leg, a first branch leg, and a second branch leg, the first branch leg and the seconds branch leg joined at a junction whereby the light may be propagated from the input leg through each of the first branch leg and the second branch leg, at least the first branch leg including a region fabricated from a material having an absorption coefficient at the switch wavelength that is higher than an absorption coefficient at the signal wavelength;

a laser diode for emitting the light at the switch wavelength; and a lens for focusing the light at the switch wavelength at the region of the first branch leg fabricated from the material having the absorption coefficient at the switch wavelength that is higher than the absorption coefficient at the signal wavelength.

13. An optical switch for switching light at a switch wavelength as opposed to a signal wavelength, the optical switch comprising:

a splitter having a waveguide defined by a core and a cladding surrounding the core, the core including an input leg, a first branch leg, and a second branch leg, the first branch leg and the seconds branch leg joined at a junction whereby the light may be propagated from the input leg through each of the first branch leg and the second branch leg, at least the first branch leg including a region fabricated from a material which changes refractive index when exposed to the light at an attenuation wavelength, but which is unresponsive to the light at a signal wavelength;

a multiplexer for combining the light at the signal wavelength and the light at the switch wavelength to produce combined light, and propagating the combined light through the input leg.

14. A variable optical attenuator for attenuating light at an attenuation wavelength as opposed to a signal wavelength, the variable optical attenuator comprising:

a waveguide having a core including a first input waveguide section, a second waveguide section which branches from the first input waveguide section at a first junction, a third waveguide section which branches from the first input waveguide section at the first junction, and a fourth output waveguide section joined to the second waveguide section and the third waveguide section at a second junction, the second waveguide section including a region fabricated from a material which changes refractive index when exposed to the light at an attenuation wavelength, but which is unresponsive to the light at a signal wavelength, wherein the material has an absorption coefficient at the switching wavelength that is at least about 100 times higher than the absorption coefficient at the signal wavelength.

15. The variable optical attenuator of claim 14 wherein a portion of the core comprises:

a blend of a polymer and an added material which when blended with the polymer imparts to the blend the ability to absorb light at the switch wavelength while remaining generally transparent to light at the signal wavelength.

16. The variable optical attenuator of claim 15 wherein the added material is selected from a group consisting of quinone, indanthrenes, methine, polymethines, phthalocyanines, naphthalocyanines, porphyrins, organic dyes, a metal ion, or metal particles.

17. The variable optical attenuator of claim 16 wherein the metal particles have an average particle size of from about 20 nm to about 100 nm.

18. The variable optical attenuator of claim 16 wherein the metal particles are selected from a group consisting of copper, gold, silver, platinum, or palladium.

19. The variable optical attenuator of claim 16 wherein the organic dye is crystal violet.

20. The variable optical attenuator of claim 16 wherein the metal ion is Co(II).

21. The variable optical attenuator of claim 15 wherein the added material is physically blended with the polymer.

22. The variable optical attenuator of claim 15 wherein the added material is covalently bonded with the polymer.

* * * * *

UNITED STATES PATENT AND TRADEMARK OFFICE
CERTIFICATE OF CORRECTION

PATENT NO.    : 6,493,478 B1
DATED         : December 10, 2002
INVENTOR(S)   : DeRosa et al.

It is certified that error appears in the above-identified patent and that said Letters Patent is hereby corrected as shown below:

<u>Title page,</u>
Item [75], Inventor, "Stephen L. Loguov" is changed to -- Stephen L. Logunov --.

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,493,478 B1
DATED : December 10, 2002
INVENTOR(S) : DeRosa, Michael E. et al.

It is certified that error appears in the above-identified patent and that said Letters Patent is hereby corrected as shown below:

Column 1,
Lines 44-48, please insert the following equation in place of black mark: $\Delta T = \dfrac{\alpha P \tau}{\pi r_2 \rho C}$ Column 2,
Lines 42-47, please insert the following equation in place of black mark: $\tau_{bar} = \dfrac{a^2}{4\chi}$ Signed and Sealed this Twenty-seventh Day of January, 2004

JON W. DUDAS
*Acting Director of the United States Patent and Trademark Office*